Oct. 18, 1960 E. T. CLINE 2,956,899
PROCESS OF FORMING GRAFT POLYMERS ON A SHAPED POLYMERIC ORGANIC SUBSTRATE
Filed Oct. 18, 1956
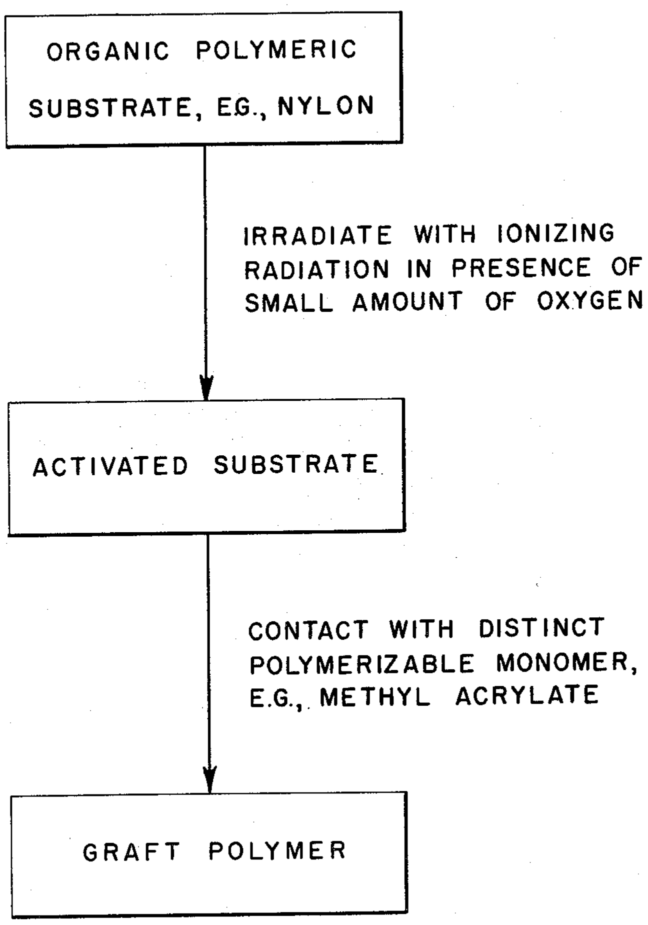
INVENTOR
EDWARD T. CLINE
BY James H. Ryan
ATTORNEY United States Patent Office 2,956,899

Patented Oct. 18, 1960

2,956,899

PROCESS OF FORMING GRAFT POLYMERS ON A SHAPED POLYMERIC ORGANIC SUBSTRATE

Edward T. Cline, Wilmington, Del., assignor to E. I. du Pont de Nemours and Company, Wilmington, Del., a corporation of Delaware Filed Oct. 18, 1956, Ser. No. 616,617

10 Claims. (Cl. 117—47)

This invention is concerned with a process for preparing coated polymeric substrates.

Polymers of the type known as graft polymers are prepared by irradiating a substrate of a preformed polymer and contacting the irradiated substrate with a monomer which then polymerizes to form a polymer different from that used as the substrate. The polymerization of the monomer is evidently caused by free radicals formed in the original polymer. The product is a composite consisting of the substrate to which a second polymer is substantially integrally attached.

In one process, the substrate is irradiated while in contact with the monomer. An undesirable feature of this process is that part of the monomer polymerizes by itself without becoming attached to the substrate. Preferably, therefore, alternate processes are employed in which the substrate is first irradiated and then contacted with the monomer.

If the initial irradiation is carried out in the presence of air or oxygen, great loss of activity occurs, particularly when any appreciable interval lapses between irradiation and contact with the monomer. This loss is not total because the oxygen contacting the irradiated substrate forms peroxides which themselves act to some extent to initiate polymerization. The activity of the peroxides is, however, much less than that of the irradiated substrate.

An object of the present invention is, consequently, provision of improvements in the manufacture of graft polymers.

Another object is provision of a method for irradiating a polymeric substrate to produce free radicals therein in such a manner as to avoid deactivation of the free radicals.

The above-mentioned and further objects are achieved in accordance with this invention by a process in which a polymeric substrate is irradiated in the presence of about $10^{13}$ to $5\times10^{16}$ molecules of oxygen/cm.$^2$ of substrate surface and subsequently stored, if desired, and then contacted with the desired monomer without access to any additional quantity of oxygen. This process is illustrated broadly in the appended drawing, a self-explanatory flowsheet therefor.

In a preferred embodiment of the invention, a shaped organic polymer chosen as the substrate for the graft polymer is exposed to at least 0.01 watt-sec./cm.$^2$ of ionizing radiation in the presence of $10^{15}$–$5\times10^{16}$ molecules of oxygen/cm.$^2$ of surface, is then stored, if necessary, at about 0–50° C., absent more oxygen than that mentioned, and is finally contacted with a suitable ethylenically-unsaturated, polymerizable monomer again in the absence of additional molecular oxygen.

While there is no intention of being limited by the following speculation, it is believed that the present process depends upon chemical bonding between the polymeric substrate and its polymerized coating material (which differs chemically from hte substrate). Irradiation of polymeric materials tends to effect formation of the free radicals mentioned above. It is believed that these free radicals are formed in and on the surface of the uncoated polymeric substrate, and that they are preserved during the storage step. In the contacting step of the present process they serve as polymerization initiators, whereby polymeric chains are grown and expanded to form a high molecular weight polymeric attachment or coating chemically bonded to the substrate. Only those free radicals which can be reached by the polymerizable monomer (i.e., those on or near the surface of the substrate) are active in the present invention. The presence of oxygen in excess of $5\times10^{16}$ molecules/cm.$^2$ of polymer surface during irradiation and/or storage destroys the effect of irradiation in the present invention.

Shaped organic polymers suitable for treatment include any normally solid organic polymeric material, particularly those with molecular weights in excess of 500 and especially in excess of 1000. The polymers may be oriented or unoriented. Thus, there may be employed hydrocarbon polymers, such as polyethylene, polystyrene, polybutadiene, rubber, polyisobutylene, butadiene/styrene copolymers and the like; halogenated hydrocarbon polymers such as polyvinyl chloride, polyvinylidene chloride, polychloroprene, polytetrafluoroethylene, polyvinyl fluoride and the like; ester-containing polymers, such as polyvinyl acetate, polymethyl methacrylate, polyethylene terephthalate and the like; hydroxyl-containing polymers, such as polyvinyl alcohol, cellulose, regenerated cellulose and the like; ether-containing polymers, such as solid polytetrahydrofuran, dioxolane polymers and the like; condensation polymers, such as phenol-formaldehyde polymers, urea-formaldehyde polymers, triazine-formaldehyde polymers, polyamides, polyimides, and the like; polyacrylonitrile, polyvinyl acetals and mixtures or copolymers based on two or more of the above compounds, as well as natural polymers such as cotton, wool, silk and the like.

The shape of the organic polymer employed as a substrate in the present invention is not limited. It may be a woven fabric as illustrated in the examples which follow. Also, it may be a film, molded object, fiber, knitted fabric, tube, pipe, beading, tape, extruded molding, wire covering, powder or the like. Of particular advantage are films, fibers, fabrics, and various extruded forms since they are readily adapted to continuous operation according to the process of this invention. Shaped polymers in these forms may be unrolled or extruded into the path of ionizing radiation and then either run substantially immediately into contact with the polymerizable monomer or wound up and contacted with the polymerizable monomer in a separate treatment.

Monomers suitable for use in the contacting step of the present invention are unsaturated, polymerizable monomers chemically distinct (i.e., give a different polymer) from the polymer of the substrate being coated. There are included those monomers containing at least one unit of carbon-to-carbon unsaturation of either the ethylenic or acetylenic type. Thus, there may be employed vinyl chloride, vinylidene chloride, vinyl fluoride, tetrafluoroethylene, vinyl acetate, vinyl benzoate, acrylonitrile, methacrylonitrile, alkyl acrylates, alkyl chloroacrylates, alkyl methacrylates, propiolic acid, phenylpropiolic acid, ethyl propiolate, styrene, methyl styrene, chlorostyrene, butadiene, isoprene, chlorobutadiene, vinyl ketones, vinyl ethers, divinyl ether, and the like.

Suitable ionizing radiations include both radiation in the form sometimes regarded as particle radiation and radiation in the form sometimes regarded as ionizing electromagnetic radiation.

By particle radiation is meant an emission of accelerated electrons or nuclear particles such as protons, neutrons, alpha-particles, deuterons, beta-particles, or the like, so that the said particle impinges upon the shaped organic polymer. The charged particles may be accelerated by means of a suitable voltage gradient, using such devices as a cathode ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of the invention may be obtained from an atomic pile, or from radioactive isotopes or from other natural or artificial radioactive materials.

By ionizing electromagnetic radiation is meant radiation of the type produced when a metal target (e.g., tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, it is acceptable to refer to energy equivalents between, for example, radiation commonly considered as particle radiation and radiation commonly considered as wave or electromagnetic radiation. In the process of this invention radiation which has an energy equivalent of an electron beam of at least 0.00015 mev. may be employed and beam energies in excess of 0.00005 mev. are preferred. Radiation with energy equivalent to an electron beam of 0.00005 to 0.1 mev. is preferred where radiation of this energy is available at low cost and time is not a primary factor in the economic aspect of the process. Radiation with energy equivalent to an electron beam of 0.1 mev. and over (i.e., 0.1 mev. up to 2 to 5 mev.) is preferred where the cost of the higher intensity radiation may be offset by the saving in exposure time. This is particularly true in continuous operation. Radiation with higher energies (i.e., 10 mev. and higher) may also be employed.

A minimum exposure of at least 0.01 watt-sec./cm.$^2$ at the surface is necessary since lower degrees of exposure do not give adequate activation of the surface toward the bonding of the polymerizable monomer. The weight of the coating formed in the contacting step usually increases with increasing degrees of exposure. Upper exposure limits depend on the degree of bonding desired and on the radiation resistance of the polymeric substrate. Exposures as high as 1000 to 10,000 watt-sec./cm.$^2$ may be utilized in coating radiation-resistant polymers such as polystyrene and polyethylene terephthalate, whereas exposures of 100 to 1000 watt-sec./cm.$^2$ may suffice for more sensitive polymers such as polyvinyl chloride and the polyamides. The exposure may be carried out in one slow pass, or in several faster ones and may be conducted at any convenient amperage.

While a vacuum is the preferred means for limiting the access of oxygen to the irradiated shaped polymer, other means may be employed. For example, an inert gas, such as nitrogen, argon, helium or the like, containing molecular oxygen within the limits prescribed above, at atmospheric pressure, will serve the desired purpose.

The monomer may be gaseous or liquid when contacted with the irradiated substrate. It is particularly important that the contacting step should not involve admitting additional oxygen to the system. This is true whether contacting takes place at subatmospheric pressures of about 10–100 mm. of mercury or at higher pressures, e.g., up to atmospheric pressure, which can be employed when oxygen concentration is controlled by dilution with an inert gas. Preferably the pressure of the monomer is identical with that over the substrate when they are contacted. Alternatively, aqueous or other solutions of the monomer or, in fact, pure liquid monomer can be used. Control of the reaction is less easy when the monomer is liquid or in solution.

The temperature of contact between irradiated substrate and monomer is not critical. Ambient temperature is convenient and hence preferred. If, however, storage of the substrate is employed, temperatures down to 0° C. or even lower are desired. To avoid loss of activity of the free radicals, the temperature of contact should not, in any case, rise above the crystalline melting point of the substrate. In general, contact temperatures below about 100° C. are preferred, although in some cases temperatures in the range of 100–200° C. may be employed when the contact time is short.

An important advantage of this invention is that the irradiation of the shaped organic polymer may be carried out under conditions best adapted for irradiation as in an atomic pile or under the influence of a particle accelerator. The contacting step may be carried out later under conditions adapted for it and free of radiation hazards and the often-cumbersome radiation apparatus. Also, with this process radiation-sensitive, unsaturated monomeric grafting materials need not be exposed to the radiation.

The process of the present invention is valuable in creating surface effects upon shaped articles produced from organic polymers. It may be employed upon textiles to affect softness, resilience, tendency to shrink, static propensity, dyeability, pilling, hydrophilicity, wickability, and the like. It is useful in varying such properties as abrasion and wear resistance, moisture regain, dry-cleaning properties, light durability, soilability, ease of soil removal, laundering properties, dyeability (depth, rate, permanence and uniformity), printability, washfastness of dyes or finishing treatments (resins), ultraviolet absorbers, etc.), handle and drape properties (stiffening or softening), heat-yellowing, snag resistance, ease in textile processability, solubility (insolubilization or increase in solubility), bleachability, surface reactivity, delustering action, drying properties, thermal and electrical conductivity, transparency, light transmittance, air and water permeability, fabric comfort, felting, ion exchange properties, adhesion, over-all appearance and combinations of these as well as others.

There follow some examples intended to illustrate, but not to limit, the practice of the invention. In these examples, parts are by weight and pressures are in millimeters of mercury except where otherwise specified.

*Example I*

A glass vessel containing air and about 1.5 parts of dry 66 nylon fabric and 2 parts of dry polyethylene terephthalate fabric (both fabrics woven from filaments of about 3 denier) was evacuated to an absolute pressure of 1 mm. and sealed. The free space in the vessel was such that this pressure corresponded to $7.8 \times 10^{16}$ molecules of oxygen/g. of fabric which in turn corresponded to $4.2 \times 10^{13}$ molecules of oxygen/cm.$^2$ of fiber surface. The wall thickness of the vessel was 0.24 g./cm.$^2$. The vessel was exposed to 125 watt-sec./cm.$^2$ of 2 mev. electrons from a Van de Graaff acceleration. The thickness of the fabric was such that all of the fibers were within range of the electrons.

After irradiation, the vessel and contents were stored for 24 hours at room temperature. The vessel was then evacuated to 0.05 mm. pressure and opened to a similarly evacuated system containing degassed liquid methyl acrylate. The fabrics were thus in contact with methyl acrylate vapor. Light was excluded and the reaction between the fabrics and the methyl acrylate vapor was allowed to proceed at room temperature for 15 hours. The fabrics were removed from the vessel and extracted with acetone in a Soxhlet extractor for 15 hours to remove excess monomer and surface polymer not firmly attached to the fabric. The fabrics were rinsed in water and conditioned at 50% relative humidity and 23° C. The nylon fabric was found to have gained 274% in weight and the polyethylene terephthalate fabric had gained 166% in weight.

The fabrics were much stiffer, tighter and drier in hand than before the treatment. They were much less readily penetrated by water and hence much more suitable for such uses as tenting and tarpaulins than the original fabrics.

In a control experiment a nylon fabric was treated similarly except that it was not irradiated. After exposure to methyl acrylate vapors for 15 hours, the fabric had increased in weight only 0.6%.

*Example II*

The procedure of Example I was repeated except that, prior to irradiation, the air in the vessel was exhausted only to an absolute pressure of 10 mm. This pressure is equivalent to $7.8 \times 10^{17}$ oxygen molecules/g. of fiber or to $4.2 \times 10^{14}$ molecules of oxygen/cm.$^2$ of fiber surface. During the 15 hours of contact between the fabrics and the methyl acrylate vapor, the supply of liquid methyl acrylate was exhausted. After conditioning, the nylon fabric was found to have gained 121% in weight and the polyethylene terephthalate fabric had gained 176% in weight.

*Example III*

A nylon fabric was treated in the manner of Example I except that the air pressure in the vessel prior to irradiation was 25 mm. corresponding to $5 \times 10^{18}$ molecules of oxygen/g. of fiber which in turn corresponds to $2.7 \times 10^{15}$ molecules of oxygen/cm.$^2$ of fiber surface. At the end of the procedure the fabric had gained 250% in weight.

*Example IV*

A nylon fabric was treated as in Example I except that the air pressure in the vessel prior to irradiation was 50 mm. Based on the free space in the vessel, this pressure corresponded to $1 \times 10^{19}$ molecules of oxygen/g. of fiber or to $5.4 \times 10^{15}$ molecules of oxygen/cm.$^2$ of fiber surface. At the end of the treatment the fabric had gained only 2.5% in weight.

*Example V*

The process of Example IV was repeated except that the air pressure in the vessel prior to irradiation was 99 mm. This corresponds to $2 \times 10^{19}$ molecules of oxygen/g. of fiber which in turn corresponds to $1.1 \times 10^{16}$ molecules of oxygen/cm.$^2$ of fiber surface. At the end of the treatment the fabric had gained 1% in weight.

It will be readily appreciated that the surface area of a given weight of shaped organic polymer will vary with the particular shape employed. In a given space employed for carrying out irradiations according to this invention, an oxygen content which has little effect on bonding of a coating to a given weight of polymer in the form of very fine fibers might be sufficient to destroy all the bonding activity in the same weight of the same polymer in the form of a molded object with substantially lower surface area.

In Example III there is shown the irradiation of 3 denier nylon fibers in a container which at 25 mm. absolute pressure of air contains $2.7 \times 10^{15}$ molecules of oxygen/cm.$^2$ of fiber surface. If the same weight of nylon is in the form of 1 denier fibers in the same container at the same pressure, the ratio is $1.6 \times 10^{15}$ molecules of oxygen/cm.$^2$ of fiber surface. If the same weight of nylon is in the form of a film 0.006″ thick under the same conditions, the ratio is $4.4 \times 10^{16}$ molecules of oxygen/cm.$^2$ of film surface. This is shown along with data for other shapes of polymer and other pressures for conditions otherwise like those of Example III:

| Fiber Denier or Film Thickness | Surface Area/g., cm.$^2$ | Molecules $O_2$ per cm.$^2$ at Pressures of— | | | |
|---|---|---|---|---|---|
| | | 1 mm. | 25 mm. | 50 mm. | 99 mm. |
| 1 | 3,170 | $2.5 \times 10^{13}$ | $1.6 \times 10^{15}$ | $3.2 \times 10^{15}$ | $6.3 \times 10^{15}$ |
| 3 | 1,850 | $4.2 \times 10^{13}$ | $2.7 \times 10^{15}$ | $5.4 \times 10^{15}$ | $1.1 \times 10^{16}$ |
| 5 | 1,430 | $5.5 \times 10^{13}$ | $3.5 \times 10^{15}$ | $7.0 \times 10^{15}$ | $1.4 \times 10^{16}$ |
| 3 mil film | 230 | $3.4 \times 10^{14}$ | $2.2 \times 10^{16}$ | $4.4 \times 10^{16}$ | $8.7 \times 10^{16}$ |
| 6 mil film | 115 | $6.8 \times 10^{14}$ | $4.4 \times 10^{16}$ | $8.8 \times 10^{16}$ | $1.7 \times 10^{17}$ |

It will be noted that with both of the film shapes at 99 mm. air pressure and with the 0.006″ film at 50 mm. air pressure, the ratio of $5 \times 10^{16}$ oxygen molecules/cm.$^2$ of polymer surface, the ratio for good bonding, is exceeded. The lower limit of $10^{13}$ molecules of oxygen/cm.$^2$ of polymer surface represents a practical lower limit below which the cost of maintaining the low oxygen content offsets the advantages of the present invention.

The foregoing detailed description has been given for clearness in understanding and no unnecessary limitations are to be inferred therefrom. The invention is not retricted to the exact details shown and described since obvious modifications will occur to those skilled in the art.

The embodiments of the invention in which an exclusive property or privilege is claimed are defined as follows:

1. The process which comprises (1) irradiating a shaped polymeric organic substrate with at least about 0.01 watt-sec./cm.$^2$ of substrate surface of ionizing radiation in the presence of about $10^{13}$ to $5 \times 10^{16}$ molecules of oxygen/cm.$^2$ of substrate surface, (2) subsequently contacting the irradiated substrate with a chemically distinct, unsaturated, polymerizable monomer with no additional access of oxygen, thereby polymerizing the monomer on and bonding it to the surface of the substrate, (3) removing excess monomer from contact with the polymer, and (4) finally recovering a graft polymer in the form of the original shaped substrate.

2. The process of claim 1 in which the ionizing radiation is particle radiation.

3. The process of claim 2 in which the ionizing radiation is accelerated electrons.

4. The process of claim 1 in which the ionizing radiation is electromagnetic radiation.

5. The process of claim 4 in which the ionizing radiation is X-rays.

6. The process of claim 1 in which the energy of the ionizing radiation is at least 0.000015 mev.

7. The process of claim 1 in which the substrate is a polyamide.

8. The process of claim 7 in which the monomer is methyl acrylate.

9. The process of claim 1 in which the substrate is a polyester.

10. The process of claim 9 in which the monomer is methyl acrylate.

References Cited in the file of this patent

UNITED STATES PATENTS 2,666,025 Nozaki ________________ Jan. 12, 1954
2,766,220 Kantor ________________ Oct. 9, 1956

FOREIGN PATENTS 732,047 Great Britain ___________ June 15, 1955

OTHER REFERENCES

"Modern Plastics," vol. 32, No. 10, June 1955, pages 159, 252, and 254.

Ballantine: "J. of Polymer," vol. 19, No. 91, January 1956, pages 219–224.

B.N.L. 375, Quarterly Progress Report, Oct. 1–Dec. 31, 1955, p. 26, April 1956.

B.N.L. 367, Quarterly Progress Report, July 1–Sept. 30, 1955, pp. 27, 28, February 1956.

UNITED STATES PATENT OFFICE

CERTIFICATE OF CORRECTION

Patent No. 2,956,899 October 18, 1960

Edward T. Cline

It is hereby certified that error appears in the printed specification of the above numbered patent requiring correction and that the said Letters Patent should read as corrected below.

Column 1, line 71, for "hte" read -- the --; column 3, line 32, for "0.00015" read -- 0.000015 --; column 4, line 21, for "conditions adapted" read -- conditions best adapted --.

Signed and sealed this 25th day of April 1961.

(SEAL)
Attest:

ERNEST W. SWIDER
Attesting Officer

DAVID L. LADD
Commissioner of Patents